June 26, 1934. R. E. SKOW ET AL 1,964,708
APPARATUS TO BE USED IN THE DISTILLING OF LIQUIDS SUCH AS WATER
Filed Dec. 27, 1932 4 Sheets-Sheet 1

INVENTORS
Ross E. Skow
Virg Ballou
Herrold L. McLaughlin
BY
M. Talbert Dick
ATTORNEY.

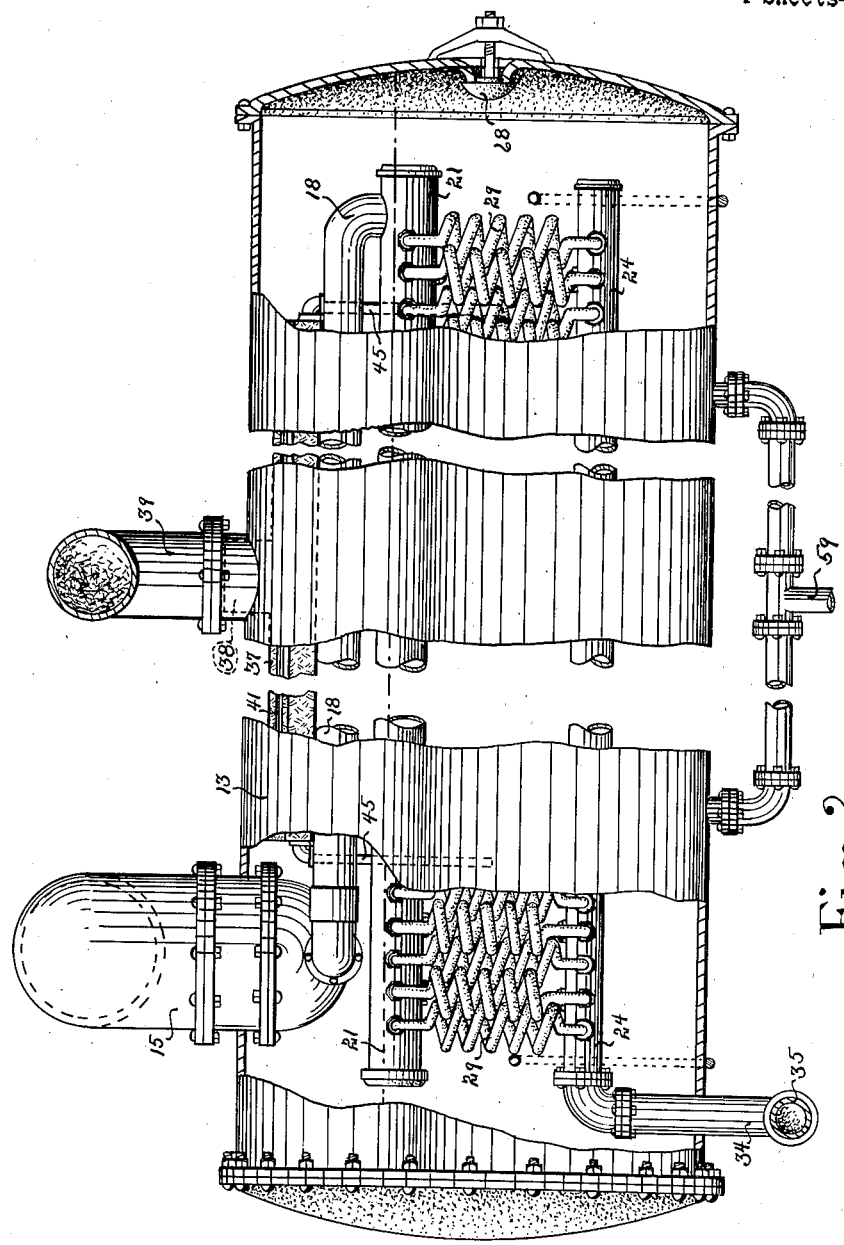

June 26, 1934.  R. E. SKOW ET AL  1,964,708
APPARATUS TO BE USED IN THE DISTILLING OF LIQUIDS SUCH AS WATER
Filed Dec. 27, 1932  4 Sheets-Sheet 3
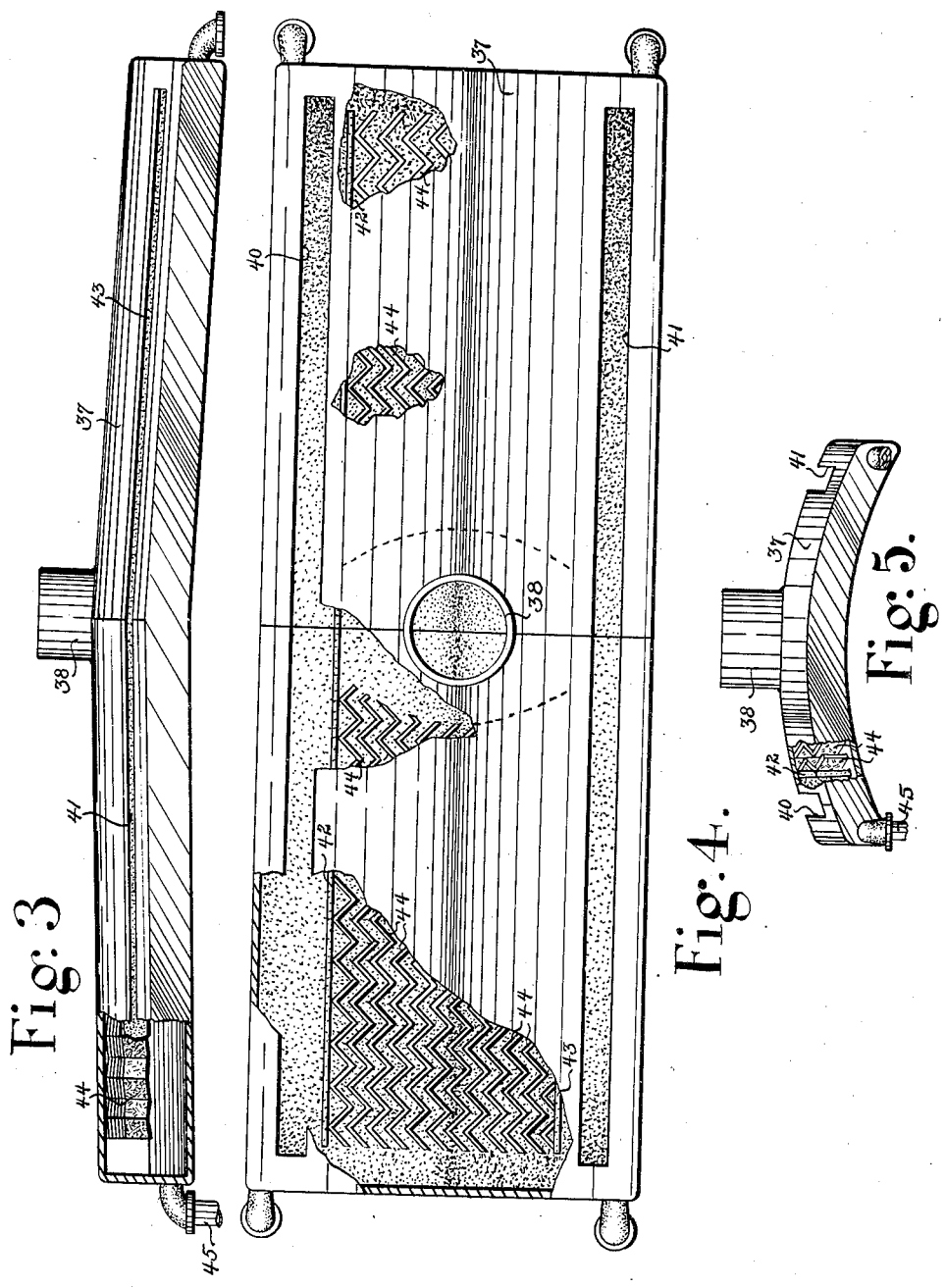
INVENTORS
Ross E. Skow
Virg. Ballou
Herrold L. McLaughlin
BY
M. Talbert Dick
ATTORNEY.

June 26, 1934.  R. E. SKOW ET AL  1,964,708
APPARATUS TO BE USED IN THE DISTILLING OF LIQUIDS SUCH AS WATER
Filed Dec. 27, 1932  4 Sheets-Sheet 4

INVENTORS
Ross E. Skow
Virg Ballou
Herrold L. McLaughlin
BY
M. Talbert Dick
ATTORNEY.

Patented June 26, 1934

1,964,708

UNITED STATES PATENT OFFICE 1,964,708

APPARATUS TO BE USED IN THE DISTILLING OF LIQUIDS SUCH AS WATER

Ross E. Skow, Virg Ballou, and Herrold L. McLaughlin, Des Moines, Iowa, assignors to National Pure Water Corporation, Des Moines, Iowa, a corporation of Iowa Application December 27, 1932, Serial No. 648,950

8 Claims. (Cl. 202—173)

This invention relates to an apparatus for distilling water or other liquids; and has for some of its objects to provide an apparatus of the class referred to which shall be automatic throughout, shall be simple, durable and economical in construction, and safe, certain and efficient in operation.

More specifically, the object of our invention is to provide a multiple of connected condensers in series to be used in the distilling of liquids that are each capable of not only condensing vapors that enter them by relieving the vapors of heat units, but are capable of transferring such heat units obtained to liquid for producing vapor therefrom at a lower pressure and temperature than the pressure and temperature of the vapor entering the condenser.

A still further object of our invention is to provide a unit condenser that is capable of reducing a high temperature vapor into a liquid, that is capable of producing a lower pressure vapor from liquid by means of the exchange of heat from the high temperature vapor, and that is capable also of removing any solid or liquid particles from the lower temperature vapor produced before the same passes from the condenser.

A still further object of our invention is to produce a condenser, heat exchanger, evaporator, and vapor purifier in one housing, thereby eliminating the loss of many valuable heat units.

A still further object of this invention is to provide an efficient combination condenser and evaporator that occupies a minimum amount of space relative to its capacity.

A still further object of our invention is to produce a condenser and heat exchanger that permits rapid cooling for the contracting of the coils for shedding scale, encrustating salts, and like.

A still further object of this invention is to provide a combination condenser and evaporator that is so constructed and designed as to give equal loading and uniform vapor distribution to all coils alike.

These and other objects will be apparent to those skilled in the art.

Our invention consists in the construction, arrangement, and combination of the various parts of the device, whereby the objects contemplated are attained as hereinafter more fully set forth, pointed out in our claims and illustrated in the accompanying drawings, in which:

Fig. 2 is a side view of one of the combination condensers, heat exchangers, evaporators, and vapor purifiers with sections cut away and removed to more fully illustrate the construction of the same.

Fig. 3 is a side view of our vapor purifier used in each of our condensers with a section cut away for illustrative purposes.

Fig. 4 is a top plan view of our vapor purifier with portions cut away to more fully illustrate its interior construction.

Fig. 5 is an end sectional view of the vapor purifier.

The use of distilled water for commercial purposes is increasing rapidly. The chief trouble, however, in using distilled water is its high cost of production. It is our aim to provide an apparatus that will make it possible to produce distilled water economically and in great quantities. To accomplish this our apparatus initially produces vapor of high pressure and temperature and this high pressure and temperature vapor is used, by means of heat transfer, to vaporize additional liquid at a lower pressure and temperature. This "stepping down" process may be continued in series until the vapor pressure is below that of atmospheric pressure with each stage condensing the vapor by the heat transfer in each unit. We will now describe the various features and parts of our apparatus.

Figure 1:
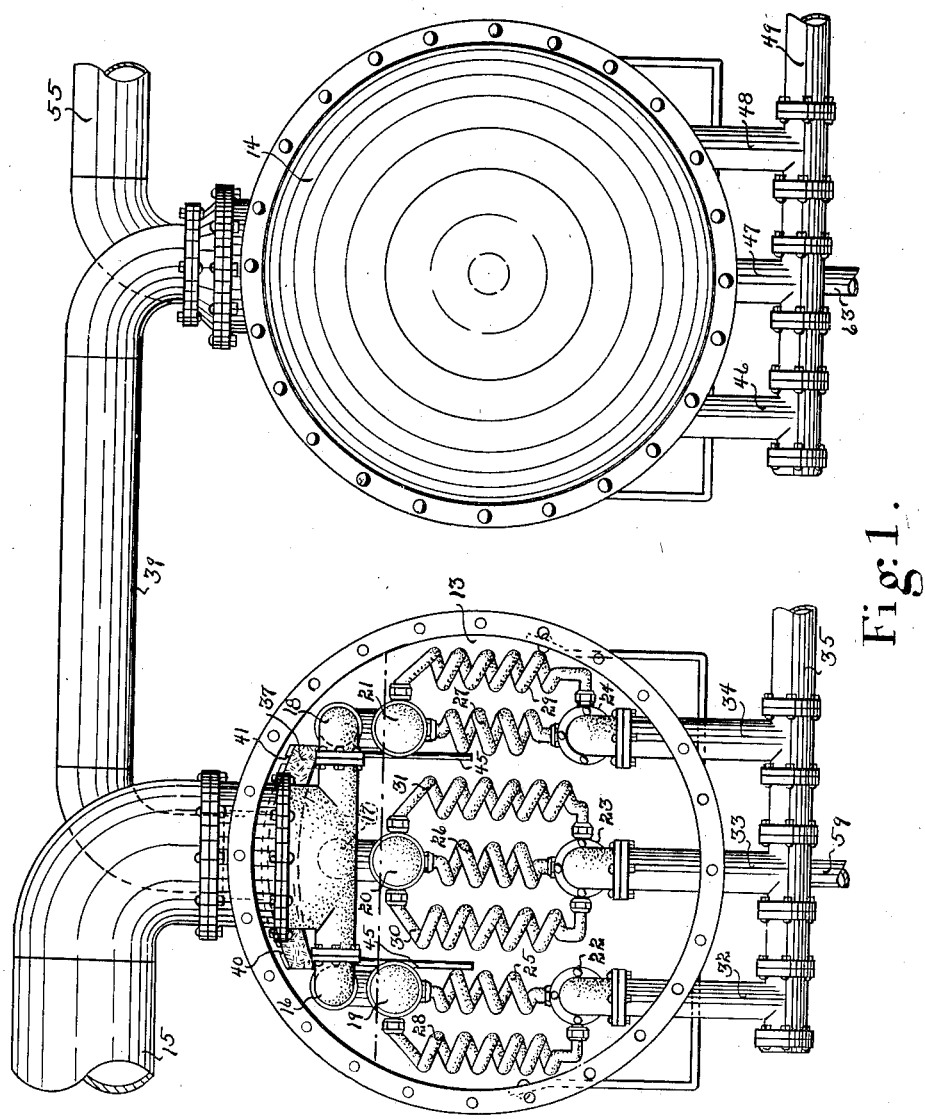
Fig. 1 is an end view of two combination condensers, heat exchangers, evaporators, and vapor purifiers suitably connected to each other and with the head removed from one of the units to more fully illustrate the inside end view of the same.
Figure 7:
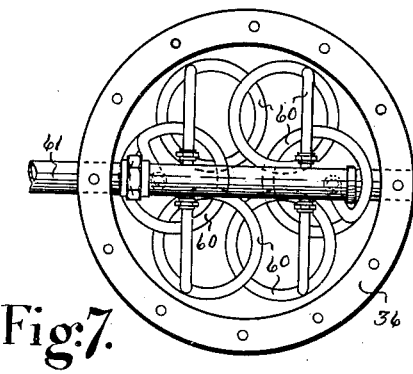
Fig. 7 is a top plan view of one of the auxiliary heat exchangers and is taken on line 7—7 of Fig. 6.

We have used the numeral 10 to designate any suitable boiler of the high pressure type. The water inlet pipe of this boiler is designated by the numeral 11. The high pressure vapor outlet pipe of the boiler is designated by the numeral 12. In the drawings, we show two combination condensers, heat exchangers, evaporators, and vapor purifiers. It is understood, however, that any number of these units may be used in series. Each of these units, as far as construction is concerned, is practically identical with the other. We have used the numeral 13 to designate the cylindrical housing of the first unit and the numeral 14 to designate the cylindrical housing of the second unit, as shown in Fig. 1. The numeral 15 designates a vapor pipe having one end communicating with the inside of the pipe 12 and its other end extending into the top rear end portion of the housing 13. The end of this pipe 15 that extends into the housing 13 is closed, but communicates with three spaced apart longitudinal pipes 16, 17, and 18. These three pipes rest in the same horizontal plane near the top of the housing 13 and extend to a point near the forward end of the housing 13 where they are bent downwardly to communicate with the forward ends of the three spaced apart pipes 19, 20, and 21 respectively. These pipes 19, 20, and 21 rest in a common horizontal plane and extend longitudinally to the rear in the housing 13 and just below the pipes 16, 17, and 18 respectively. The numerals 22, 23, and 24 designate three spaced apart longitudinally arranged pipes positioned in the bottom portion of the housing 13. These pipes 22, 23, and 24 rest in a common horizontal plane and are directly below the pipes 19, 20, and 21 respectively. It will here be noted that the pipes 19, 20, 21, 22, 23, 24 extend approximately the inside length of the housing 13. Each end of the pipes 19, 20, and 21 are capped and the forward ends of the pipes 22, 23, and 24 are capped.

The numeral 25 designates a row of coiled tubes each communicating with the inside bottom of the pipe 19 and the inside top of the pipe 22. In order that the coiled tubes will nest with each other and make for higher efficiency every other coil is spiraled to the right; the remaining tubes being spiraled to the left. The numeral 26 designates a similar row of coiled tubes, each communicating with the inside bottom of the pipe 20 and the inside top of the pipe 23. The numeral 27 also designates a similar row of coiled tubes communicating with the inside bottom of the pipe 21 and the inside top of the pipe 24. The numeral 28 designates a row of coiled tubes each having their upper ends communicating with the inside of the pipe 19 at points along the left side of that pipe and their lower ends communicating with the inside of the pipe 22 at points along the left side of that pipe. These coiled tubes 28 are nested by being spiraled to the left and right similar to the coiled tubes above described and are offset, as shown in Fig. 1, to form a vertical row spaced apart from and to the left of the rows 25. The numeral 29 designates a similar row of coiled tubes each having their upper ends communicating with the inside of the pipe 21 at points along the right side of that pipe and their lower ends communicating with the inside of the pipe 24 at points along the right side of that pipe, as shown in Fig. 2. The numeral 30 designates a row of coiled tubes each having their upper ends communicating with the inside of the pipe 20 at points along the left side of that pipe and their lower ends communicating with the inside of the pipe 23 at points along the left side of that pipe. The numeral 31 designates a similar row of coiled tubes each having their upper ends communicating with the inside of the pipe 20 at points along the right side of that pipe and their lower ends communicating with the inside of the pipe 23 at points along the right side of that pipe.

By offsetting the rows of tubes 28, 29, 30, and 31, as shown in Fig. 1, each of these rows will be spaced apart from each other and spaced apart from the rows of coiled tubes 25, 26, and 27. Each row of coils is nested, as before noted, by every other coil being spiraled to the right and the remaining coils of each row spiraled to the left. Also, each coil of each row is spiraled in an opposite direction from the direction of spiral of the coil at its side in one of the other rows. The numerals 32, 33, and 34 designate pipes communicating with the inside rear end of the pipes 22, 23, and 24 respectively. These pipes 32, 33, and 34 discharge into a common pipe 35. This pipe 35 discharges into the inside top of an auxiliary heat exchanger tank 36.

A vapor purifier is mounted in the top portion of each of the housings 13 and 14 and we will now describe this phase of the invention. The numeral 37 generally designates the vapor purifier housing. This housing is comparatively shallow, has a curved bottom, and a curved top to conform with the inside top of a condenser and evaporator housing as shown in Fig. 1. The housing 37 is an elongated one extending longitudinally of the condenser and evaporator housing and is positioned just above the pipes 16, 17, and 18. The housing is spaced a slight distance from the inside top of the condenser and evaporator housing and slopes slightly downwardly and outwardly from its center. The numeral 38 designates an outlet pipe communicating with the top center of the housing 37 and extending upwardly out of the condenser and evaporator housing to communicate with the inside of the pipe 39. The numerals 40 and 41 designate two longitudinal slots in the top of the housing 37. These slots are positioned near the longitudinal sides respectively of the housing 37, as shown in Fig. 4.

The numerals 42 and 43 designate two vertical partitions in the housing 37. These two partitions are spaced apart and extend longitudinally of the housing 37, but do not extend to the ends of the housing 37. The partition 42 is positioned just to the inside of the slot opening 40 and the partition 43 is positioned just to the inside of the slot opening 41. The numeral 44 designates a plurality of staggered baffle walls in the space between the two partitions 42 and 43. Near each corner of the housing 37 is a water and material outlet pipe 45 extending downwardly in the condenser and evaporator housing, as shown in Fig. 1. The housing 37 has a comparatively large cross sectional area in order to keep vapor velocity at a minimum. The main purpose of the vapor purifier is to extract all of the free moisture from the outgoing vapor leaving the condenser and evaporator. By its specific construction the vapor forming in the top of the condenser and evaporator will pass into the housing 37 through the slots 40 and 41. Regardless of which slot opening the vapor passes through it will be required to travel toward one of the ends of the housing 37 to get by either the partition 42 or partition 43. After passing to either end of the housing 37 it will flow toward the center of the housing between the two partitions 42 and 43, but to do so it must travel a tortuous path, due to the vertical wall baffle members 44, as shown in Fig. 4. Due to the slow velocity of the vapor in traveling these sinuous paths it will not be able to retain its moisture and particles in suspension. In accomplishing this removal of particles from the vapor both gravity and the tendency of adhesion of the water particles to the baffle walls will play a major part. By the time the vapor reaches the center portion of the housing 37 it will be in a purified state and may leave the housing 37 through the member 36 and into the pipe 39.

By the housing 37 extending downwardly and outwardly from its center the particles obtained from the vapor will pass to each end of the housing 37 where they will pass through the pipes 45 downwardly and be discharged below the liquid line in the condenser and evaporator housing.

Figure 8:
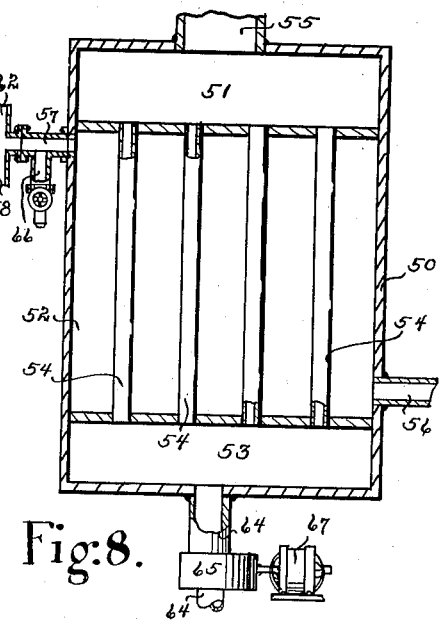
Fig. 8 is a diminished side sectional view of an ordinary condensing unit used in our distilling apparatus.

As before noted, the two condensers and evaporators are duplicates. The pipes 32, 33, and 34, however, leading from the number two unit have been designated for purposes of identification by the numerals 46, 47, and 48, respectively. These pipes 46, 47, and 48 discharge into the common pipe 49. The pipe 39 discharges its vapor into the three pipes 16, 17, and 18 in the second unit in the same manner that the pipe 15 discharges its vapor into the pipes 16, 17, and 18 of the first unit. It is self-evident that a great number of units could be used, depending upon the amount of temperature and pressure entering the first unit. However, the last unit of the series will produce vapor which must be condensed by some means. In order to take care of this last phase any type of condenser may be used. In Fig. 8 I show the conventional form of an ordinary condenser. The housing of this condenser is designated by the numeral 50. It has a top compartment 51, a middle compartment 52, and a bottom compartment 53. The compartments 51 and 53 communicate with each other by the tubes 54. The pipe 55 leading from the vapor purifier of the last unit discharges into the compartment 51. This vapor to reach the compartment 53 must pass through the tubes 54. The numeral 56 designates a pipe having one end in communication with a source of hard water of ordinary temperature and its other end communicating with the inside of the compartment 52. As this hard water surrounds the tubes 54 the vapor passing through these tubes will be cooled and condensed and when reaching the compartment 53 will be in liquid form.

Figure 6:
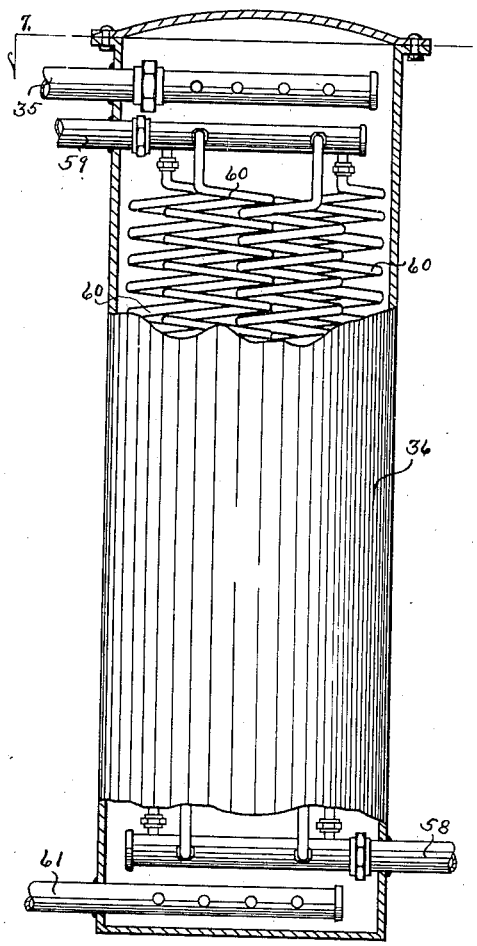
Fig. 6 is a side view of one of the auxiliary heat exchangers which forms a part of our apparatus and has sections cut away to illustrate its construction.
Figure 9:
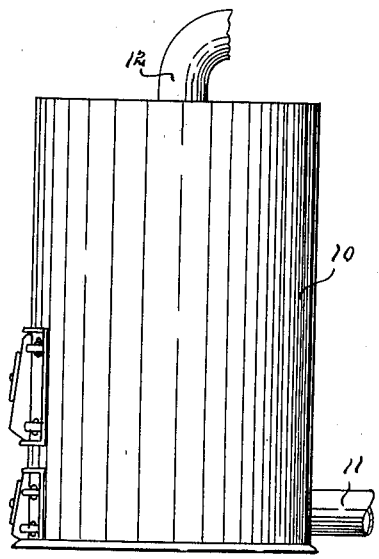
Fig. 9 is a diminished side view of an ordinary boiler used in our distilling apparatus.

The numeral 57 designates a pipe having one end communicating with the inside top of the compartment 52 and its other end communicating with the inside of the pipe 11 of the boiler. This hard water passing out of the pipe 57 will naturally be of a higher temperature than when it entered the compartment 52 and in such warm state it will enter the boiler 10, thereby requiring less additional heat to vaporize it. As we have seen, an auxiliary heat exchanger is used with each condenser and evaporator unit. We will now describe the auxiliary heat exchanger as used with the first unit. The numeral 58 designates a pipe having one end communicating with the inside of the pipe 57 and its other end extending into the lower end portion of the auxiliary heat exchanger tank 36. The numeral 59 designates a pipe having one end extending into the upper portion of the tank 36 and its other end communicating with the inside bottom of the condenser and evaporator housing 13 at two points, as shown in Fig. 2. The numeral 60 designates six coiled tubes nested with each other and each having their upper ends communicating with the inside of the pipe 59 and their lower ends communicating with the inside of the pipe 58, as shown in Fig. 6. By this arrangement, warmed water passing through the pipe 58 will pass through the coils 60 of the auxiliary heat exchanger to enter the pipe 59. As the pipe 35 will fill the tank 36 with extremely hot distilled liquid from the first condenser and evaporator, this water passing into the pipe 59 will have absorbed valuable heat units from the distilled liquid and in such high heated state will pass into the bottom of the first condenser and evaporator in liquid form. By the time the hot distilled liquid reaches the bottom of the tank 36 it will be substantially cooled and will pass out through the pipe 61 as distilled liquid, which is the desired product.

The auxiliary heat exchanger used for the second condenser and evaporator is an exact duplicate of the auxiliary heat exchanger just described for use with the first condenser and evaporator. In the matter of the second auxiliary heat exchanger warmed liquid is obtained from the pipe 57 by the pipe 62 which communicates with the inside of the same. The pipe 49 of the second condenser and evaporator furnishes the hot distilled liquid for the second auxiliary heat exchanger. The highly heated hard liquid from the second auxiliary heat exchanger passes into the bottom of the second condenser and evaporator through the pipe 63 in the same manner of operation as the pipe 59. A similar pipe to pipe 61 will lead from the bottom of the second auxiliary heat exchanger for the removal of the distilled liquid. It will here be noted that we draw off the desired distilled liquid from three points, i. e., the bottom of the first auxiliary heat exchanger, the bottom of the second auxiliary heat exchanger, and from the compartment 53 of the condenser shown in Fig. 8. The distilled liquid is drawn from the compartment 53 through the pipe 64. The numeral 65 designates a vacuum pump interimposed in the pipe 64. The numeral 66 designates a pipe communicating with the inside of the pipe 57 for caring for surplus heated hard water. The water obtained from the pipe 66 may be used for other auxiliary purposes needing warmed hard water or liquid.

From the above it will be seen that in building our apparatus we have attempted to utilize for useful purposes the latent heat in vapors of high pressure and temperature. We utilize such latent heat for vaporizing additional liquid at a lower temperature and pressure by means of heat transfer, whereby the higher temperature and pressure vapor is condensed and the liquid used therefor is vaporized at a somewhat less pressure and temperature.

The reason that we first start with a vapor of high pressure and temperature is that it is well known that a vapor can be produced more economically in a high pressure boiler than in a low pressure boiler. Although it depends upon the temperature and pressure of the vapor leaving the boiler and the number of condensers and evaporators used in the series, the pressure of the vapor leaving the last condenser and evaporator of the series may be less than that of atmospheric pressures and when this is the case it is accomplished by the use of a vacuum pump, as shown in Fig. 8, which may be run by any suitable prime mover 67.

By having a plurality of separate coiled tubes in each row any one or number of the coiled tubes may be easily removed or replaced when making repairs. In order to periodically inspect the amount of scale on these coiled tubes we have provided an opening in the end of each of the condensers and evaporators which is normally kept closed by a detachable closing member 68. Also, these openings provide a rapid means for the introduction of air to cool the coiled tubes when it is desired to remove undesirable scales from the coiled tubes by contraction and expansion.

Equal loading and uniform vapor distribution to all the coils in each of the condensers and evaporators is obtained by having incoming vapor discharged into the forward end portions of the tubes 19, 20, and 21 and the condensed liquid passing from the pipes 22, 23, and 24 at their rear ends respectively. It will also be noted that the auxiliary heat exchangers prevent any of the condensed liquid which is of high pressure and temperature from reverting to vapor, which a certain portion of the liquid would tend to do in order to maintain itself.

From the foregoing it will readily be seen that we have provided an apparatus for distilling liquids that is continuous in operation and is economical in manufacture.

Some changes may be made in the construction and arrangement of our improved apparatus to be used in the distilling of liquids such as water without departing from the real spirit and purpose of our invention, and it is our intention to cover by our claims any modified forms of structure or use of mechanical equivalents which may be reasonably included within their scope.

We claim:

1. In an apparatus used in the distilling of liquids, a housing, a hollow vapor distributing member in the upper portion of said housing, a hollow liquid receiving member in the bottom portion of said housing, a plurality of coiled tubes extending between and connecting the vapor distributing member and liquid receiving member, a vapor supply pipe communicating with the inside of said vapor distributing member, a vapor discharge pipe communicating with the inside top of said housing, an enclosed tank housing, a condensed liquid drain pipe having one end communicating with the inside of said liquid receiving member and its other end communicating with the inside top of said tank housing, a liquid discharge pipe leading from the bottom portion of said tank housing, a liquid supply pipe extending into the bottom portion of said tank housing, a pipe leading from the inside top of said tank housing to the inside bottom of said first mentioned housing, and a plurality of coiled tubes inside said tank housing connecting said last two mentioned pipes.

2. In an apparatus used in the distilling of liquids, a housing, a hollow vapor distributing member in the upper portion of said housing, a hollow liquid receiving member in the bottom portion of said housing, a plurality of coiled tubes extending between and connecting the vapor distributing member and liquid receiving member, a vapor supply pipe communicating with the inside of said vapor distributing member, a vapor discharge pipe communicating with the inside top of said housing, an enclosed tank housing, a condensed liquid drain pipe having one end communicating with the inside of the hollow liquid receiving member and its other end communicating with the inside of said tank housing, a liquid discharge pipe leading from said tank housing, and pipe means extending through said tank housing having one end in communication with the inside bottom of said first mentioned housing and its other end designed to be in communication with a source of liquid supply.

3. In a device of the class described, an elongated housing substantially rectangular in form and having its top and bottom curved transversely of its longitudinal axis, an outlet pipe communicating with the inside center top of said housing; said housing having a longitudinal slot opening at each side of said outlet pipe, a vertical partition wall in close proximity to each of said slot openings extending longitudinally of said housing and having a length less than the inside length of said housing, baffle members inside said housing and positioned between the two partition walls and at each side of said outlet pipe, and drain pipes leading from the inside of said housing.

4. In an apparatus used in the distilling of liquids, a housing, an enclosed element inside said housing, a vapor supply pipe communicating with the inside of said element inside said housing, a vapor discharge pipe communicating with the inside top of said housing, an enclosed tank housing, a condensed liquid drain pipe having one end communicating with the inside of said closed element inside said housing and its other end communicating with the inside of said tank housing, a liquid discharge pipe leading from said tank housing, a liquid supply pipe extending into said tank housing, a pipe leading from the said tank housing to the inside of said first-mentioned housing, and a tube inside said tank housing connecting said last two mentioned pipes.

5. In an apparatus used in the distilling of liquids, a housing, an enclosed element inside said housing, a vapor supply pipe communicating with the inside of said element inside said housing, an enclosed tank housing, a condensed liquid drain pipe having one end communicating with the inside of said closed element inside said housing and its other end communicating with the inside of said tank housing, a liquid discharge pipe leading from said tank housing, a liquid supply pipe extending into said tank housing, a pipe leading from the said tank housing to the inside of said first-mentioned housing, and a tube inside said tank housing connecting said last two mentioned pipes.

6. In a device of the class described, an elongated housing substantially rectangular in form and having its top and bottom curved transversely of its longitudinal axis, an outlet pipe communicating with the inside center top of said housing; said housing having a longitudinal slot opening at each side of said outlet pipe, a vertical partition wall in close proximity to each of said slot openings extending longitudinally of said housing and having a length less than the inside length of said housing, and baffle members inside said housing and positioned between the two partition walls and at each side of said outlet pipe.

7. In an apparatus used in the distilling of liquids, a housing designed to contain a liquid, a plurality of tubes inside said housing, a means for delivering high pressure and temperature vapor to one end of each of said tubes, a means for releaving condensed liquid from the other ends of each of said tubes, an elongated housing positioned inside and near the top of said first-mentioned housing substantially rectangular in form and having its top and bottom curved transversely of its longitudinal axis, a vapor outlet pipe communicating with the inside center top of said elongated housing; said housing having a longitudinal slot opening at each side of said outlet pipe, a vertical partition wall in close proximity to each of said slot openings extending longitudinally of said elongated housing and having a length less than the inside length of said elongated housing, baffle members inside said housing and positioned between the two partition walls and at each side of said outlet pipe, and liquid drain pipes leading from the inside of said elongated housing downwardly into said first-mentioned housing.

8. In a device of the class described, an elongated housing, an outlet pipe communicating with the inside center top of said housing; said housing having a longitudinal slot opening at each side of said outlet pipe, a vertical partition wall in close proximity to each of said slot openings extending longitudinally of said housing and having a length less than the inside length of said housing, baffle members inside said housing and positioned between the two partition walls and at each side of said outlet pipe, and drain pipes leading from the inside of said housing.

ROSS E. SKOW.
VIRG BALLOU.
HERROLD L. McLAUGHLIN.